Aug. 12, 1969     J. D. SHAW     3,460,395

FLUID MEASURING DEVICE

Filed April 28, 1967                    2 Sheets-Sheet 1

INVENTOR
Joseph D. Shaw
BY *Walter S. Murray*
ATTY.

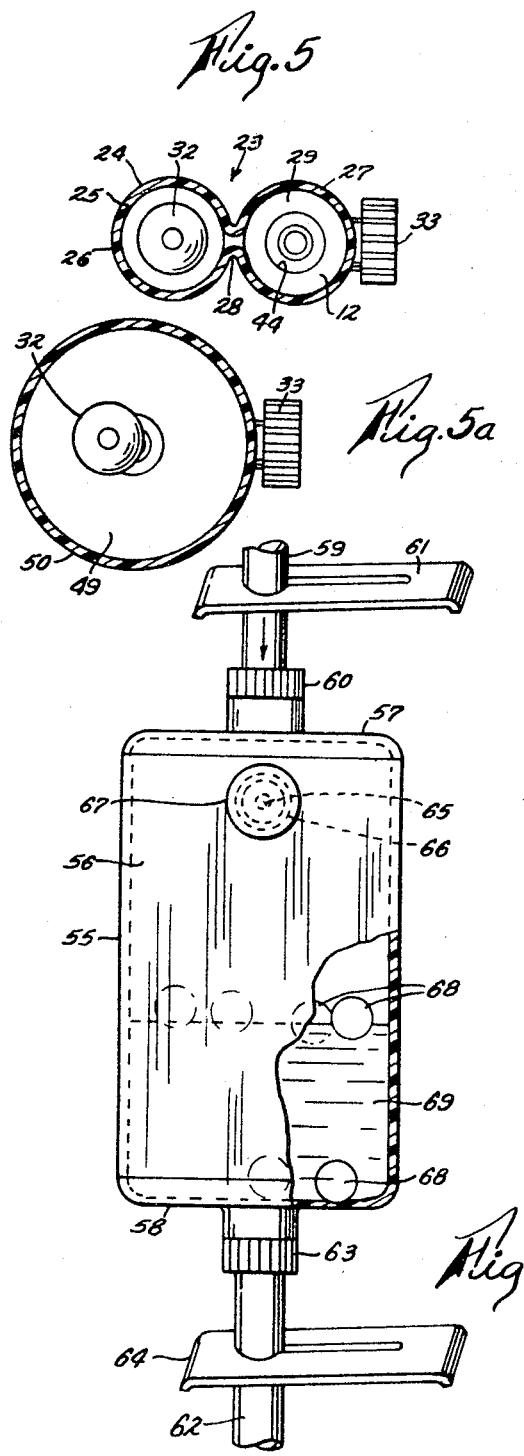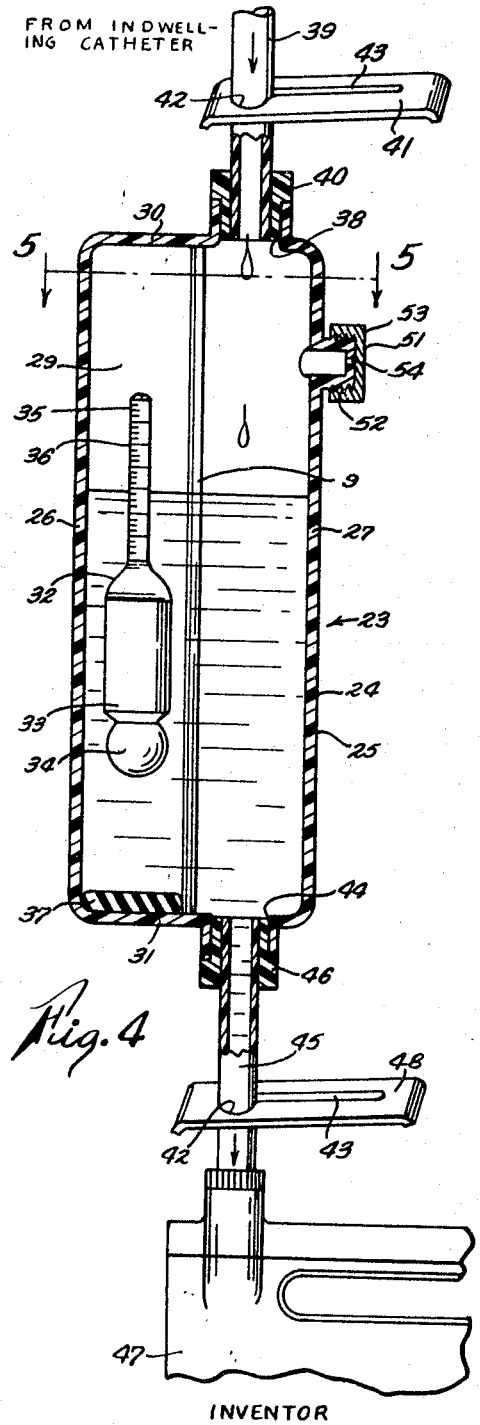

United States Patent Office 3,460,395
Patented Aug. 12, 1969

3,460,395
FLUID MEASURING DEVICE
Joseph D. Shaw, 508 Church St.,
Brownsville, Pa. 15417
Filed Apr. 28, 1967, Ser. No. 634,608
Int. Cl. G01n 9/00
U.S. Cl. 73—440                                     9 Claims

ABSTRACT OF THE DISCLOSURE

An apparatus for continuously indicating the specific weights of urine specimens discharged from human patients through conventional indwelling catheters. The apparatus includes a sealed, fluid collecting vessel that has a restricted fluid inlet opening in the upper end and an air-tight connection between said opening and a flexible catheter tube. A restricted discharge opening is formed in the bottom of the vessel whereby a predetermined volume of fluid, less than the full capacity of the vessel, can be collected and retained in said vessel. A hydrometer means is freely contained in the vessel for immersion in the collected fluid and a sighting means is provided for the vessel to take direct readings on the hydrometer exteriorly of the vessel.

---

The present invention relates to fluid measuring instruments and is particularly directed to improvements in urinometers affording accurate means of continuously checking the specific weights of urine specimens discharged from human patients.

In the practice of medicine hospital patients require urethral or suprapubic, indwelling catheters for the discharge of urine from their bodies and in some cases it is desirable to keep regular and periodic checks on specific weights of the urine specimens produced. The present procedure for obtaining the specific weight of a particular urine specimen is for the attendant to collect the specimen as it comes from the discharge tube of the catheter which is then poured into a container and a hydrometer immersed in the contained specimen; the hydrometer calibrations being then read and recorded. This method is time consuming and is objectionable in that it allows for contamination of the indwelling catheter by retrograde bacterial growth into the patient's body.

It is therefore an object of the invention to provide a urinometer for indwelling catheters that can be readily prepared for the taking of continuous readings and which will have a closed system precluding retrograde bacterial growth into the catheter.

Another object of the invention is to provide a reliable and simplified instrument for taking continuous readings of the specific weights of a patient's urine specimens while being susceptible of unobstrusive disposition about the hospital bed.

Other objects will become apparent from the following specification taken in connection with the accompanying drawings, which show several embodiments of my invention, and wherein:

FIG. 4 is a fragmental, sectional view showing a modification of my urinometer device, some parts being shown in perspective and other parts in elevation.

FIG. 5 is a section taken on line 5—5 of FIG. 4.

FIG. 5a is a section like FIG. 5 showing another modification of my urinometer device.

FIG. 6 is a fragmental, elevational view of a further modified form of my urinometer device, a part being broken away and shown in section and other parts shown in perspective.

Figure 1:
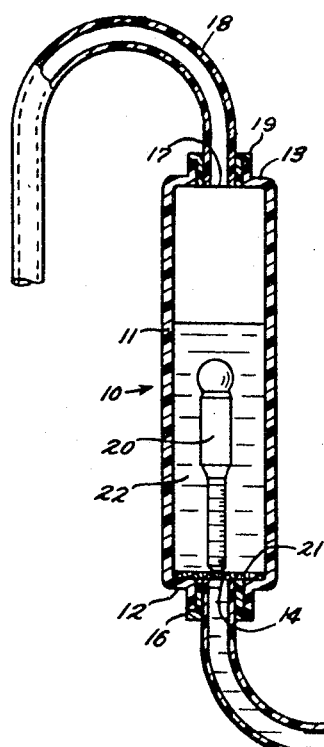
FIG. 1 is a fragmental, sectional view of one form of my urinometer device shown in valving position.
Figure 2:
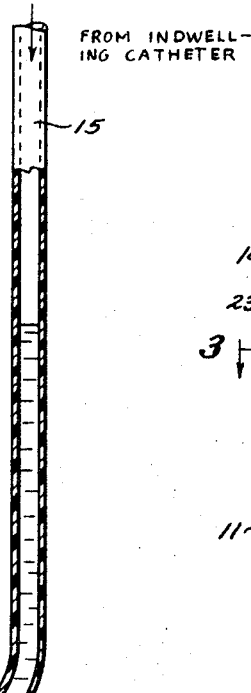
FIG. 2 is a view like FIG. 1 showing my device in operative, measuring position.
Figure 3:
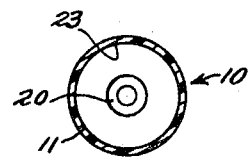
FIG. 3 is a section taken on line 3—3 of FIG. 2.

Referring now in detail to the drawings FIGS. 1, 2 and 3 show one form of my invention wherein the numeral 10 indicates a sealed urine collecting vessel having a side wall 11 and top and bottom walls 12 and 13, respectively, interconnected to the side wall, said walls being preferrably made of a transparent, flexible plastic material. A restricted fluid inlet opening 14 is formed through the top wall 12 and a flexible catheter tube 15 communicates with the interior of the vessel through the opening by means of an air-tight connection 16 between the tube and the vessel. The free end of the tube is connected in a well-known manner to an indwelling catheter (not shown) that is medically applied within the body of a hospital patient to continually carry off discharged urine. A restricted outlet opening 17 is formed through the bottom wall 13 of the vessel and this opening is connected to a tube 18 by a fitting 19, said tube conveying fluid discharged from the vessel to a conventional collector means (not shown).

A hydrometer 20 of usual design is freely contained within the vessel 10 and a screen 21 may be positioned across the inlet opening 14 to preclude entrance of the hydrometer into the tube 15 when my urinometer is in the inverted position shown in FIG. 1.

In operation after the catheter has been emplaced the tube 15 begins to convey urine into the vessel. By manually inverting the vessel as shown in FIG. 1 a predetermined volume of urine 22 is admitted into the vessel for collection therein, said volume being less than the full capacity of the vessel but sufficient to float the hydrometer 20 immersed therein. When my urinometer is turned to the operative position shown in FIG. 2 a partial vacuum will be presented in the space 23 above the surface of the urine 22 which continuously maintains the liquid level and permits the discharge of urine from the outlet 17 in a volume equal to the volume of urine introduced into the vessel through the inlet opening 14. Thus the hydrometer will remain in a continuous floating and recording position immersed in the urine 22 while urine flows through the vessel, the hydrometer readings being sighted entirely outside of the vessel through the transparent wall 11 thereof. The vessel may be drained through the tube 18 by either removing the catheter from the patient's body or by disconnecting the tube 15 from the connection 16, which allows air to enter the vessel 10 through the tube 15.

With reference to FIGS. 4 and 5 of the drawing, the numeral 23 generally indicates another measuring instrument that can be readily prepared to afford continuous readings indicative of the specific gravity of a patient's urine. The instrument consists of a sealed urine collecting vessel 24 having a one-piece, transparent body preferably made of a clear plastic material. Although the entire body of the vessel may be transparent it is contemplated that such body could be opaque and a vertically elongated transparent portion formed in its side wall alongside the hydrometer to thus provided a window for sighting the hydrometer reading therethrough. The vessel has a side wall 25 formed by two, side-by-side vertically elongated tubular portions 26 and 27 (FIG. 5) that are joined together along a laterally restricted area 28 to provide a divided chamber 29 closed at its upper end by a top wall 30 and closed at its lower end by a bottom wall 31. One tubular portion 26 contains a conventional hydrometer 32 having a buoyant mid portion 33, a weighted lower end 34 and a stem 35 projecting upwardly from the mid portion 33. The stem is calibrated at 36 to record the specific weights of liquids in which the hydrometer is to be immersed. A rubber pad 37 is positioned within the portion 26 of the vessel and upon the bottom 31 to protect the hydrometer against damage if the urinometer device is unduly jarred during handling or use.

The top wall 30 has a restricted, flanged opening 38 formed therein in vertical alignment with the tubular portion 27 of the vessel, a flexible tube 39 being connected to the flanged opening by an air-tight connector plug 40 whereby the interior of the tube is in open communication with the chamber 29 of the vessel 24. The free end of the tube 39 is connected in a well known manner to an indwelling catheter (not shown) medically applied within the body of a hospital patient to continually carry off urine discharge. A manual slide plate 41 may be provided the tube 39 at a point adjacent the urinometer device, said plate having a hole 42 formed therethrough to loosely encircle the tube and a narrow slot 43 communicating with the hole 42 which laterally restricts and closes off the tube when the tube is forced into said slot.

The bottom wall 31 is provided with a restricted, flanged opening 44 located in alignment with the tubular portion 27 of the vessel, a flexible discharge tube 45 being connected to the flanged opening by a connector plug 46 so that the interior of the tube 45 communicates with the interior of the vessel 24. The free end of the flexible tube 45 may be connected to a conventional collector bag 47 and a valving means that takes the form of a manual slide plate 48 is associated with the tube at a plate adjacent the vessel 24. It will be noted that the urine inlet and exit openings in the vessel 24 are offset with respect to the hydrometer 32 by reason of the restricted area 28 which makes it less likely that the hydrometer will be splashed by urine entering the vessel 24 which could otherwise tend toward inaccurate hyrometer readings in some instances.

As depicted in FIG. 5a the vessel 24 may have a single chamber 49 secured by a circular side wall 50 interconnected to the top and bottom walls and the hydrometer 32 would then be free to move both laterally and vertically when immersed in the urine contained in the vessel.

A means is provided the urinometer device for selectively subjecting its interior to atmospheric pressure, the means comprising a fitting 51 projecting from the upper portion of the side wall 25 of the vessel and provided with external threads 52 which cooperate with the internal threads of a closure cap 53, said fitting having a breather hole 54 formed centrally therein which opens the interior of the vessel to atmosphere when the cap 53 is removed from the fitting.

Now with reference to FIG. 6, which illustrates another modified form of my invention, the numeral 55 indicates a sealed, urine collecting vessel having a side wall 56 and an interconnected top wall 57 and a bottom wall 58 all preferably made of a transparent plastic material. The top wall 57 is connected to a flexible tube 59 having its free end associated with an indwelling catheter (not shown) and freely communicating with the interior of the vessel by means of a connector 60 having a restricted mouth leading into the vessel. A manual slide valve 61 is associated with the flexible tube 59 near the vessel for opening and closing off the tube 59, when desired.

The bottom wall 58 of the vessel 55 is connected to a tube 62 which discharges the urine specimen to a collector bag like the bag 47 shown in FIGS. 1 and 2 of the drawing. The tube freely communicates with the interior of the vessel 55 by means of a connector plug 63 having a restricted mouth, a manual slide valve 64 being associated with the tube 62 near the bottom of the vessel 55. The vessel 55 also has a breather hole 65 formed in an externally threaded projection 66 on the side wall 56, said opening 65 being closed by a cap 67. A number of beads 68 of different specific gravities are contained within the urinometer vessel 55 and each bead could be provided with a distinctive color indicative of its particular specific weight.

In operation the urinometer device shown in FIGS. 4, 5 and 5a may be clamped or mounted on any desirable part of a hospital bed in a vertical position and the tube 39 connected to an indwelling catheter, the slide valve 41 being closed during placement of the catheter to prevent the entrance of urine into the vessel durnig that time. The discharge tube 45 is now temporarily closed by laterally sliding the plate 48 so that the slot 43 therein pinches and closes off the tube. Next the air vent 54 is opened by removing the cap 53 and a volume of urine is allowed to flow through tube 39 and to collect within the chamber 29 to at least a height slightly higher than the length of the hydrometer which allows the hydrometer to float freely in the specimen under all possible specific gravities. When the hydrometer freely floats in the specimen the air vent is closed by the cap 53 and the valve 48 is opened whereby the volume of urine in the vessel will be maintained while equal volumes of urine are admitted and discharged from the vessel, to afford a continuous means of reading the specific gravity of the urine specimen on the calibrated stem 36 of the hydrometer where the level of the specimen crosses the calibrations thereon.

The vessel may be drained at any time by opening the air vent 54 and allowing the specimen in the vessel to discharge into the collector bag through the tube 45.

With reference to FIG. 6 of the drawings, the indicator beads 68 are allowed to be immersed in a urine specimen 69 collected in the vessel 55 by closing off the flexible tube 62 with the slide clamp 64 and opening the air vent 65 to atmosphere. When the proper volume of urine is collected in the vessel the air vent is closed and the valve 64 opened to allow equal volumes of urine to enter and leave the vessel while maintaining a constant level of urine within the vessel. The beads having the greatest calibrated specific weights will sink to the bottom of the specimen and the beads whose specific gravities are less than the urine specimen will float on the surface thereof. By noting the positions and colors of the beads in floating and submerged positions the specific gravity of the urine specimen in the vessel can be continually determined.

As exemplary of the hydrometer means for this last modified form of my invention it may be assumed that the specific gravity of urine may vary from 1.001 to around 1.032. A group of five beads having specific weights of 1.002 through 1.010 could be colored black; another group of five beads having specific weights from 1.012 through 1.020 could be the color red and a further group of six beads from 1.022 through 1.032 could have have the color green. In the event all the black and red beads and two green beads were afloat in a particular urine specimen its specific gravity would be read as around 1.025.

Another valving means may be provided the device shown in FIG. 1 and by the expedient in the devices shown in FIGS. 4 and 6 of maintaining the breather holes 54 and 65, respectively, in closed conditions. In this respect the one-piece transparent bodies are made of a soft, flexible plastic material and the valving is then accomplished by squeezing said bodies to force air out of them and by letting fluid into them as said bodies expand.

What is claimed is:

1. A measuring instrument of the class described comprising a sealed, fluid collecting vessel having interconnected side, top and bottom walls, a restricted fluid inlet opening formed through the top wall, a flexible catheter tube, an air-tight connection between the flexible catheter tube and the fluid inlet opening in the top wall, a restricted fluid outlet opening formed through the bottom wall of the vessel, a tube connected to the restricted outlet opening in the bottom wall adapted to convey discharged fluid from the vessel, manual control means associated with the vessel for the collection of a predetermined volume of fluid in the vessel that is less than the vessel's full capacity to provide an air space above the contained fluid, said air space being maintained under a partial vacuum by the collected fluid, a hydrometer means freely contained within the vessel for immersion in the collected fluid, and sighting means for the vessel to provide the taking of a direct reading on the hydrometer from a position exteriorly of the vessel.

2. A measuring instrument set forth in claim 1 wherein the manual control means consists of an off-on valve interposed in the tube connected to the restricted fluid outlet opening in the vessel.

3. A measuring instrument set forth in claim 2 further characterized by the fact that an air vent is formed in the vessel and a sealable closure is provided for the air vent.

4. A measuring instrument as set forth in claim 1 wherein the hydrometer is located in one side of the vessel and the inlet opening in the vessel is disposed on the opposite side of the vessel.

5. A measuring instrument as set forth in claim 4 wherein the interior of the vessel is provided with a vertically extending, centrally located guide maintaining the hydrometer in vertical operating condition.

6. A measuring instrument as set forth in claim 1 wherein the hydrometer comprises a plurality of beads having different specific gravities.

7. A measuring instrument as set forth in claim 6 wherein the beads each have different and distinguishing colors, for various ranges of specific weights.

8. A measuring instrument of the class described comprising a sealed, fluid collecting vessel having interconnected side, top and bottom walls, a restircted fluid inlet opening formed through the top wall, a flexible catheter tube, an air-tight connection between the flexible catheter tube and fluid inlet opening in the top wall, a restricted fluid outlet opening formed through the bottom wall of the vessel, a tube connected to the restricted outlet opening in the bottom wall adapted to convey discharged fluid from the vessel, said vessel being adapted to collect and retain a predetermined volume of fluid therein less than its full capacity to provide an air space above the contained fluid, said air space being maintained under a partial vacuum by the collected fluid, a hydrometer means freely contained within the vessel for immersion in the collected fluid, and sighting means for the vessel to provide the taking of a direct reading on the hydrometer from a position exteriorly of the vessel.

9. A measuring instrument as set forth in claim 8 wherein at least a side wall of the fluid containing vessel is flexible and has compressible and expandible characteristics.

References Cited

UNITED STATES PATENTS

| | | | |
|---|---|---|---|
| 24,746 | 7/1859 | Long | 73—445 |
| 1,159,889 | 11/1915 | Benjamin | 73—440 |
| 1,414,032 | 4/1922 | McCrary et al. | 73—444 |

RICHARD C. QUEISSER, Primary Examiner

JOHN K. LUNSFORD, Assistant Examiner

U.S. Cl. X.R.

73—445, 444